[11] 3,547,194

[72] Inventor John Theodore Morine
 Arlington, Mass.
[21] Appl. No. 781,947
[22] Filed Dec. 6, 1968
[45] Patented Dec. 15, 1970
[73] Assignee D. L. Maher Co.
 Woburn, Mass.
 a corporation of Massachusetts

[54] METHOD OF CLEANING GRAVEL PACKED, GRAVEL DEVELOPED, AND DRILLED IGNEOUS WELLS
 10 Claims, 3 Drawing Figs.
[52] U.S. Cl. .................................................. 166/279,
 166/307, 166/312
[51] Int. Cl. ..................................................... E21b 43/27,
 43/27, E21b 43/28
[50] Field of Search ................................................ 166/311,
 177, 312, 305—307, 279, 249, 244, 246, 51, 278;
 252/8.55, C, D

[56] References Cited
 UNITED STATES PATENTS
| | | | |
|---|---|---|---|
| 2,352,832 | 7/1944 | Gunderson .................... | 166/279X |
| 2,768,694 | 10/1956 | Moll et al. ..................... | 166/307 |
| 2,933,137 | 4/1960 | D'Audiffret et al. ........... | 166/312 |
| 3,085,929 | 4/1963 | Haslam .......................... | 252/8.55X |
| 3,285,778 | 11/1966 | Hauk .............................. | 166/311X |

*Primary Examiner*—Stephen J. Novosad
*Attorney*—Abbott Spear

ABSTRACT: Methods of cleaning and treating gravel packed, gravel developed, and drilled igneous rock wells, the cleaning being effected with a hydrochloric and hydroxy-acetic acid mixture, by surging an acid bactericide through the screened end of the well and parts of the aquifer first in one vertical direction and then the other, the bactericide preferably being the acid mixture. The cleaning is desirably followed with a copper sulfate wetting agent mixture to retard the growth of iron bacteria.

PATENTED DEC 15 1970

3,547,194

Inventor:
John Theodore Morine,
by Abbott Hean
Attorney

METHOD OF CLEANING GRAVEL PACKED, GRAVEL DEVELOPED, AND DRILLED IGNEOUS WELLS

The present invention relates to methods of cleaning gravel packed, gravel developed, and drilled igneous rock wells to free them of such flow inhibiting factors as iron and manganese bacteria, ferric hydroxide tuberculations, calcium and magnesium carbonate deposits, and organic slimes.

Wells of the above referred to type have screened bottom ends extending into the aquifer, the screens typically being a series of flat-surfaced rings assembled as a sleeve of desired length with the rings so closely spaced as to bar the ingress of any particles except fine sand. Iron bacteria exists in most wells and at times grows rapidly. When this condition occurs, soluble ferrous iron is oxidized to ferric hydroxide by the oxygen in the water. This is precipitated inside the bodies of the sheathlike bacteria and imparts both color and odor to the water. In addition, as the filamentous bacteria grows, the interstices between the sand particles in the particles in the aquifer become clogged reducing the capacity of the well.

One method for well treatment is surging with a 12½ percent sodium hypochlorite and sodium metaphosphate solution; however, in some cases the iron or manganese condition reappears within three months. Other proposals have been to use muriatic acid, objectionable because it will attack the well casings; a straight metaphosphate solution; and a straight hydroxyacetic acid solution.

The degree of effectiveness of the above treatment is highly unpredictable but I have found that by combining the hydrochloric and hydroxyacetic acids in equal or nearly equal portions, a surprisingly effective treatment uniformly results.

It is a usual procedure to surge the well contents through the screened end of the well and into parts of the aquifer. I have found that any acid bactericide treatment is much more effective if the surging is carried out to cause a flow through the aquifer in both vertical directions.

In addition, well cleaning should be followed with a solution of copper sulfate and a suitable wetting agent to retard the bacteria regrowth. This treatment, while more effective than chlorine, requires care to ensure any residual copper sulfate will be at or below standards set by the U.S. Public Health Service.

In the accompanying drawings, a well of one of the types with which the invention is concerned is shown in order that the methods of the invention as well as the problems with which it is concerned may be readily understood.

Figure 1:
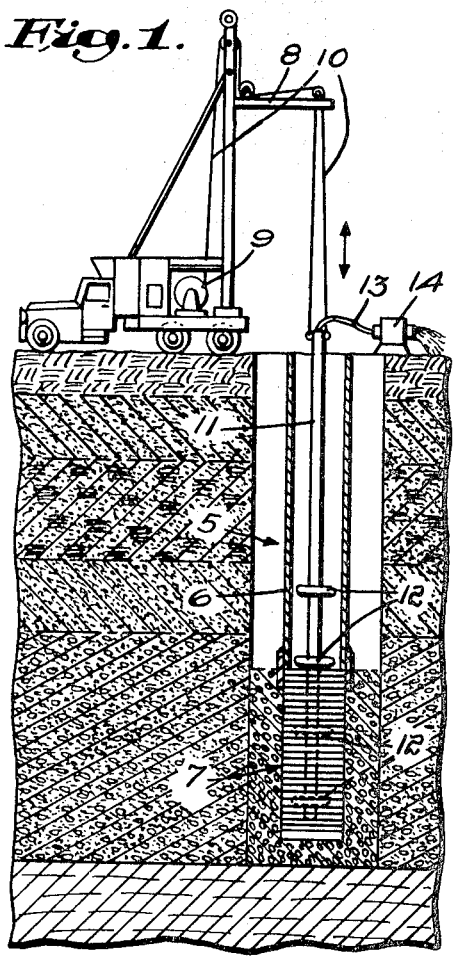
FIG. 1 is a partly sectioned view illustrating well surging.
Figure 2:
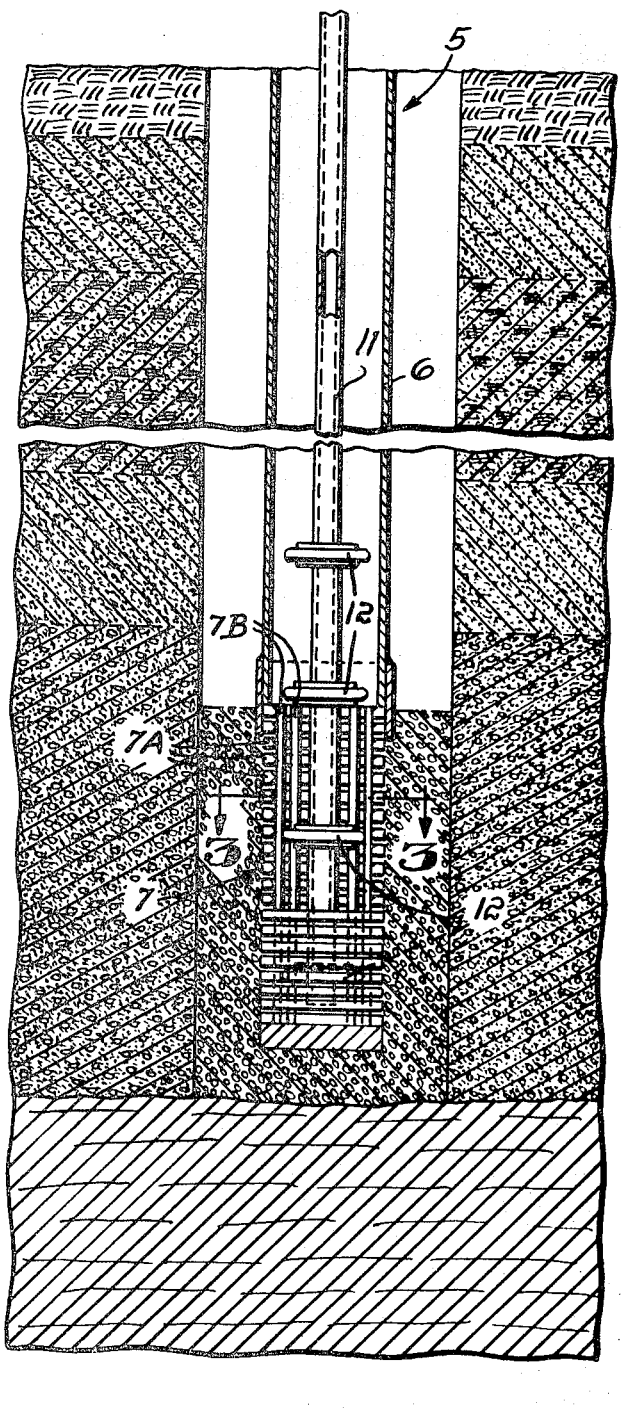
FIG. 2 is a like view on an increased scale.
Figure 3:
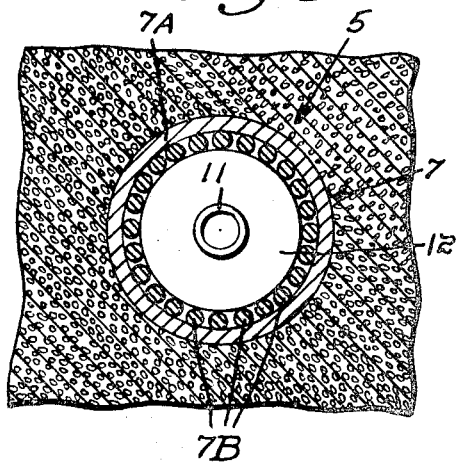
FIG. 3 is a section taken approximately along the indicated lines 3–3 of FIG. 2.

A gravel packed well 5 has a casing 6 and a bottom screened end 7 extending into the aquifer. Such a screened end typically has a closed bottom and consists of flat-surfaced rings 7A interconnected in closely spaced relationship by vertical members 7B to admit water water but to exclude all particles except fine sands, which are allowed through the screen and pumped to waste during development.

When rapidly growing iron bacteria directly impedes the flow of water through the aquifer and screened bottom end of the well or when this result is due to ferric hydroxide tuberculations, calcium and magnesium carbonate deposits, or organic slimes, treatment is necessary to restore the well to its normal capacity.

In accordance with the invention, the well contents are estimated and a mixture of hydrochloric and hydroxyacetic acid is added thereto in amounts equal to about 40 percent to 50 percent of the well water volume. The acid mixture ranges from 40—60 percent to 60—40 percent by volume of the acids, the hydrochloric acid being a 35 percent by volume concentration and the hydroxyacetic acid being a 70 percent by volume concentration.

Best results are obtained by surging the well contents to force it through the screened bottom end and into parts of the aquifer. This is effected as by means of a rig having a boom 8 and a power-driven reel 9 for a cable 10 which supports a pipe 11 having a disc 12 thereon. The pipe 11 has a flexible conduit 13 connecting it to a pump 14 by which the well contents may be surged and, or pumped to waste during the treatment. The well is redeveloped until a sand free condition is obtained which varies greatly from well to well.

In accordance with the invention, the surging treatment is modified by providing the pipe 11 with a plurality of disks 12 spaced axially about five feet apart with at least one disc being positioned, during surging, above the well screen and with at least one disc within the screened end. The disks are a free fit within the screened end. On the reciprocation of the pipe 11 with plural disks located as above described, the treating liquid is not only forced into and out of parts of the aquifer but is also circulated in both vertical directions to ensure the most effective restoring treatment.

After treatment, the well contents are pumped to waste and it is desirable to introduce into the well copper sulfate with a wetting agent in amounts equal to about 25 percent of the well water volume. After a suitable period, usually 24 hours, the well contents are pumped to waste until tests show a residual copper content equal to or less than the existing standard as determined by the U.S. Public Health Service. Suitable wetting agents are sodium metaphosphate, hexametaphosphate, and blended polyphosphates.

I claim:

1. The method of cleaning gravel packed, gravel developed having screened bottom ends, and drilled igneous rock wells to free them of one or more of the following flow inhibiting factors; iron and manganese bacteria, ferric hydroxide tuberculations, calcium and magnesium carbonate deposits, and organic slimes, said method comprising the steps of preparing a mixture of hydrochloric acid and hydroxyacetic acid in the approximate range of from 40—60 percent to 60—40 percent by volume of the acids, the hydrochloric acid being a 35 percent by volume concentration and the hydroxyacetic acid being a 70 percent by volume concentration, introducing the mixture into the well, leaving said mixture in the well until the flow inhibiting factor is reduced to its suspended state, and then pumping the well contents to waste until the well is free of the mixture and the suspension.

2. The method of claim 1 in which the mixture is introduced into the well in an amount in the approximate range of 40—50 percent of the well water volume.

3. The method of claim 1 in which the acid proportions are approximately 50 percent.

4. The method of claim 1 and the step of forcing the diluted acid mixture through the screened bottom end of the well and circulating it vertically through parts of the aquifer.

5. The method of claim 4 in which the diluted acid mixture is circulated through parts of the aquifer in both vertical directions.

6. The method of claim 1 and the steps of introducing into the well a mixture of copper sulfate and a wetting agent in amounts such that the well contents is about 25 percent concentration thereof, forcing the well contents into the aquifer through the screened bottom end of the well, leaving the mixture in the well for about 24 hours, and then pumping the well contents to waste until test analysis shows residual copper sulfate in amounts equal to or less than standards established by the U.S. Public Health Service.

7. The method of cleaning gravel packed, gravel developed, and drilled igneous rock wells to free them of one or more of the following flow inhibiting factors; iron and manganese bacteria, ferric hydroxide tuberculations, calcium and magnesium carbonate deposits, and organic slimes, the steps of introducing into the well an acid bactericidal solution, surging the well water-solution mixture through the aquifer first in one generally vertical direction and then in the opposite direction until the factor to be eliminated is reduced to a suspended solution, and then pumping the well water to waste until the well is free of the bactericidal solution and the suspension.

8. The method of retarding the growth of iron and manganese bacteria in water wells that comprises the steps of introducing into the well a mixture of copper sulfate and a wetting agent in amounts such that the well contents is about a 25 percent concentration thereof, forcing the well contents into the aquifer, leaving the mixture in the well for about 24 hours, and then pumping the well contents to waste until test analysis shows residual copper sulfate in amounts equal to or less than standards established by the U.S. Public Health Service.

9. The method of claim 8 in which the wetting agent is from the group consisting of sodium metaphosphate, hexametaphosphate, and blended polyphosphates.

10. The method of redeveloping the aquifer of gravel packed and gravel developed wells, each having a cylindrical screen at its bottom end, to control such flow inhibiting factors as iron and manganese bacteria, ferric hydroxide tuberculations, calcium and magnesium carbonates, and organic slimes, said method comprising the steps of inserting into the well a plurality of interconnected disks of an outside diameter slightly less than the inside diameter of the screen with at least one disc above the screened end and at least one disc in the screened end and then reciprocating the disks to create positive flows through the screen and through parts of the aquifer first in one vertical direction and then the other.